United States Patent [19]

Oshiro et al.

[11] Patent Number: 4,558,634
[45] Date of Patent: Dec. 17, 1985

[54] VENTILATION SYSTEM FOR MOTOR VEHICLES

[75] Inventors: Takao Oshiro, Toyoake; Akira Fukami; Hideaki Sasaya, both of Okazaki, all of Japan

[73] Assignees: Nippondenso Co., Ltd., Kariya; Nippon Soken, Inc., Nishio, both of Japan

[21] Appl. No.: 630,529

[22] Filed: Jul. 13, 1984

[30] Foreign Application Priority Data

Jul. 13, 1983 [JP] Japan .................................. 58-128460

[51] Int. Cl.⁴ ............................................... B60H 1/24
[52] U.S. Cl. ........................................ 98/2.18; 98/900
[58] Field of Search ................ 98/2, 2.14, 2.18, 2.01; 296/91

[56] References Cited

U.S. PATENT DOCUMENTS 2,134,724 11/1938 McClanahan et al. .......... 98/2.18 X
3,059,562 10/1962 Sturtevant et al. .............. 98/2.18 X

FOREIGN PATENT DOCUMENTS

| 159057 | 2/1983 | German Democratic Rep. ........................... 98/2.18 |
| 53-140731 | 12/1978 | Japan ................................. 98/2.18 |
| 57-11105 | 1/1982 | Japan ................................. 98/2.18 |
| 1509177 | 4/1978 | United Kingdom ................. 98/2.18 |

*Primary Examiner*—Harold Joyce
*Attorney, Agent, or Firm*—Cushman, Darby & Cushman

[57] ABSTRACT

A ventilation system for a motor vehicle such as an automobile includes a ventilating hole defined in a body of the motor vehicle for venting an interior of the body to atmosphere, and an aerodynamic device such as an air spoiler mounted on the body at the ventilating hole and having a lower surface held against an outer surface of the body, a front surface for forming a negative angle of elevation with respect to an air current flowing along the body while the automobile is running, and a rear surface for separating the air current off said body. The aerodynamic device has a vent hole extending therethrough from the lower surface to the rear surface in communication with the ventilating hole.

6 Claims, 8 Drawing Figures

VENTILATION SYSTEM FOR MOTOR VEHICLES

BACKGROUND OF THE INVENTION

The present invention relates to a ventilation system for use on motor vehicles such as automobiles, and more particularly to such a ventilation system including an air spoiler or an aerodynamic stabilizer attached to the body of the motor vehicle.

Aerodynamic devices known as air spoilers for motor vehicles are mounted on the body of the motor vehicle for adjusting a coefficient of drag ($C_D$) and a coefficient of lift ($C_L$) which are indicative of drag and lift forces, respectively, developed on the car body as it moves through air. The air spoilers are effective in stabilizing car maneuverability for an improved high-speed running performance and also in preventing foreign matter from being attached to a front windshield while the motor vechile is running. The air spoilers have heretofore been used solely to improve aerodynamic characteristics of motor vehicles.

SUMMARY OF THE INVENTION

It is an object of the present invention to provide a ventilation system for motor vehicles which includes an air spoiler serving to pass an air flow therethrough for the purpose of ventilating a passenger compartment or an engine compartment.

According to the present invention, a ventilation system for a motor vehicle such as an automobile includes a ventilating hole defined in a body of the motor vehicle for venting an interior of the body to atmosphere, and an aerodynamic device such as an air spoiler mounted on the body at the ventilating hole and having a lower surface held against an outer surface of the body, a front surface for forming a negative angle of elevation with respect to an air current flowing along the body while the automobile is running, and a rear surface for separating the air current off said body. The aerodynamic device has a vent hole extending therethrough from the lower surface to the rear surface in communication with the ventilating hole.

BRIEF DESCRIPTION OF THE DRAWINGS

The present invention will be described in detail by way of illustrative example with reference to the accompanying drawings, in which.

DETAILED DESCRIPTION

Figure 1:
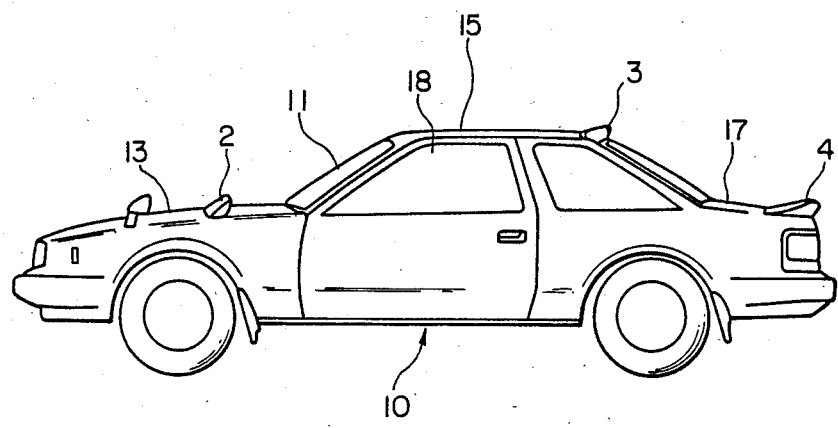
FIG. 1 is a side elevational view of an automobile incoporating a ventilation system according to the present invention.

FIG. 1 shows an automobile in which a ventilation system according to the present invention is incorporated. The automobile, generally designated at 10, has various aerodynamic stabilizers known as air spoilers mounted on an upper surface of the automobile 10. Such air spoilers include a front air spoiler 2 attached to a front hood 13 in front of a front windshield 11 for preventing foreign matter such as muddy water or insects from being attached to the front windshield 11 and also for developing an aerodynamic downforce on the front end of the automobile 10 to prevent the automobile front end from being lifted, a roof air spoiler 3 attached to the rear end of a roof 15 of a passenger compartment 18 for generating an aerodynamic downforce on the rear end of the roof 15 to prevent a rear portion of the automobile body from being lifted, and a rear air spoiler 4 mounted on a rear end of a trunk lid 17 for producing an aerodynamic downforce on the trunk lid rear end to prevent the rear end of the automobile body from being lifted.

Figure 2:
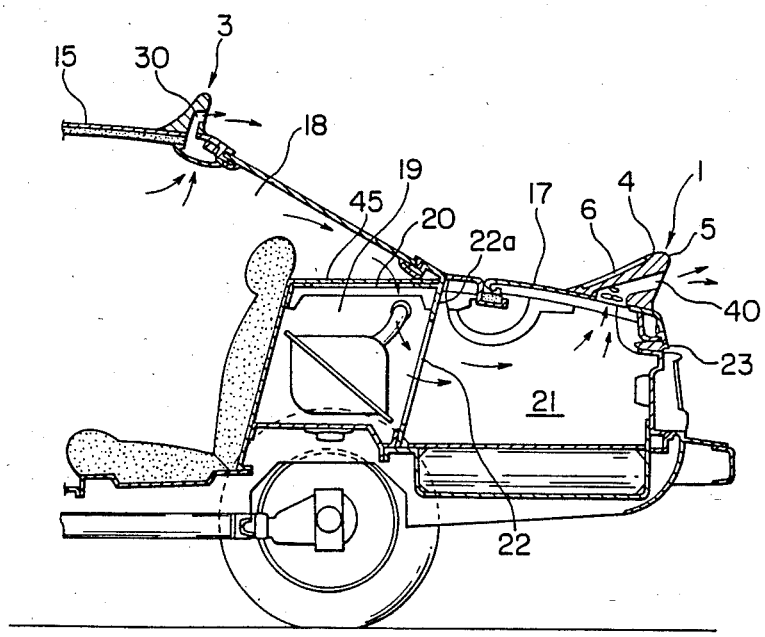
FIG. 2 is an enlarged fragmentary vertical cross-sectional view of a rear portion of the automobile.
Figure 3:
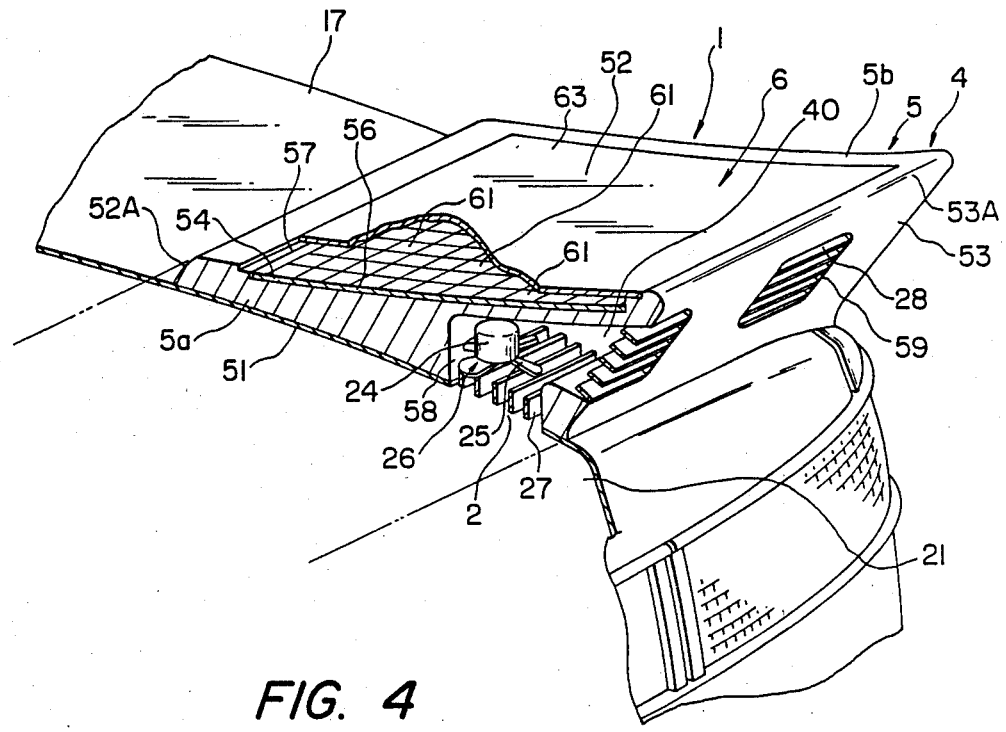
FIG. 3 is an enlarged fragmentary perspective view of the ventilation system.

FIGS. 2 and 3 illustrate a ventilation system of the present invention which utilizes the rear air spoiler 4.

The ventilation system, generally designated at 1 in FIGS. 2 and 3, is of the type known as a flow-through ventilation system and has a communication hole 20 defined in a rear end panel 45 such as a package tray 45 in the passenger compartment 18, a slit 22 defined in a partition 22a between a fuel tank room 19 and a trunk room 21 and providing communication between the fuel tank room 19 and the trunk room 21, and a ventilating opening 23 defined in the rear end of the trunk lid 17 and venting the interior of the trunk room 21 to atmosphere. The ventilation system 1 also includes the rear air spoiler 4 which is fixed to an outer wall surface of the rear end of the trunk lid 17 and having a vent hole 40 communicating with the ventilating opening 23.

The rear air spoiler 4 comprises a transversely elongate rear spoiler body 5 of a substantially wedge-shaped cross section including an inner member 5a made of a light molded material such as soft foamed urethane and an outer surface layer 5b made of a rigid material such as dense urethane, and a solar cell assembly 6 fixed to an upper surface of the rear air spoiler body 5.

As illustrated in FIG. 3, the rear air spoiler body 5 has a length substantially equal to the width of the automobile body and includes a lower surface 51 attached to the automobile body, a front or upper surface 52 joined to the lower surface 51 along a front edge 52A and lying at an acute angle to the lower surface 51 so that the upper surface 52 is angularly spaced from the direction of an air stream flowing along the upper surface of the automobile body through a negative angle of elevation for developing an aerodynamic downforce on the rear air spoiler body 5, and a rear surface 53 joined to the front surface 52 along a rear edge 53A and lying at an acute angle to the front surface 52 for separating the air stream flowing down the front surface 52 reliably off the rear air spoiler body 5. The front surface 52 has a shallow recess 54 substantially over its entire area except a surrrounding marginal edge and a vent hole 40 defined therein and having an inlet 58 which is open in the lower surface 51 in registry with the ventilating opening 23 and outlets 59 which are open in the rear surface 53. A forced-ventilation mechanism 26 is disposed in the vent hole 40 and comprises a motor 24 and a fan 25 coupled therewith for being driven thereby. A grid assembly 27 is disposed in the vent hole 40 at the inlet 58, and a grille assembly 28 is disposed in the vent hole 40 at the outlets 59 for preventing water from entering the vent hole 40 through outlets 59.

The solar cell assembly 6 comprises a matrix of solar cells 61 mounted on a bottom 56 of the recess 54, an electric connector means (not shown) by which the solar cells are connected as series-connected sets that are connected parallel to each other so that the solar cells 61 will produce a predetermined voltage and a predetermined current upon photovoltaic electric energy generation, and a transparent cover 63 placed over the solar cells 61 and fitted in the recess 54, the transparent cover 63 having a peripheral edge held in engagement with a step 57 extending along the edge which defines the recess 54.

An output lead wire (not shown) for the solar cells 61 has one end connected to the electric connector means and an opposite end to the motor 24 and other electric devices such as a battery (not shown) mounted on the automobile 10.

Each of the solar cells 61 may comprise a photovoltaic cell of single-crystal silicon, polycrystalline silicon, GaAs, CdS, amorphous silicon, or an organic semiconductor, or a wet photovoltaic cell. The transparent cover 63 may be in the form of a plastic sheet such as of acrylic resin or vinyl chloride, or may be made of HPR sandwich glass. The cover 63 may be translucent. the cover 63 may be secured to the rear air spoiler body 5 by bonding the peripheral edge of the cover 63 to the step 57 around the recess 54 with an adhesive, or by screws, or by both an adhesive and screws.

The rear air spoiler 4 may be fixed to the trunk lid 17 by an adhesive or a double-sided adhesive tape. Alternatively, bolts (not shown) may be attached at one ends to a reinforcing iron web (not shown) embedded in the body 5 with opposite ends projecting downwardly from the lower surface 51 of the body 5, and the bolts may be inserted through holes defined in the trunk lid 17 with nuts (not shown) threaded over the bolts against the inner surface of the trunk lid 17. Still another fastening means may comprise stays secured to the ends of the body 5 and clamping the lateral ends of the trunk lid 17.

Operation of the ventilation system 1 shown in FIGS. 2 and 3 is as follows: While the automobile 10 is running, an aerodynamic downforce is developed on the air spoiler 4 due to an air stream deflected by the front surface 52 of the air spoiler body 5, thereby preventing the automobile body from being lifted and providing improved automobile maneuverability. The air current is separated off the air spoiler 4 at the rear edge 53A to produce vortices behind the rear surface 53 which creates a lower air pressure to draw air from the trunk room 21 through the vent hole 40. Therefore, air is drawn out of the passenger compartment 18 through the communication hole 20 and the slit 22 to achieve effective ventilation. While the automobile 10 is at rest, the motor 24 is energized by the solar cell assembly 6 or the battery (not shown) to rotate the fan 25 for forcibly ventilating the passenger compartment 18. Accordingly, hot air can be dischraged out of the passenger compartment 18 while the automobile 10 is stopped under the scorching sun.

The communication hole 20 in the rear end of the passenger compartment 18, or a vent hole 30 in the roof air spoiler 3 (FIG. 2) selectively discharges air from the rear end of the passenger compartment 18 or a space just below the roof 15 for an increased cooling capability, the rear end of the compartment 18 and the space just below the roof 15 being subjected to a highest temperature in the compartment 18. Since an electric energy needed by the motor 24 and other electrical accessories can be supplied from the solar cell assembly 6 which generates electric power while the automobile 10 is running or at rest under the sun, the motor 24 and other electric devices can be powered and the battery can be charged by the solar cell assembly 10 without operating the engine or discharging the battery. The solar cell assembly 6 is protected from overheating to improve its photoelectric conversion efficiency since it is cooled by an air flow through the vent hole 40.

In the illustrated embodiment, sufficient ventilation can be effected while the automobile 10 is running without the forced-ventilation mechanism 26. The grid assembly 27 and the grille assembly 28 may be dispensed with though they should preferably be installed for preventing water, dust, dirt and insects from entering the trunk room 21 through the rear air spoiler 4.

Figure 4:
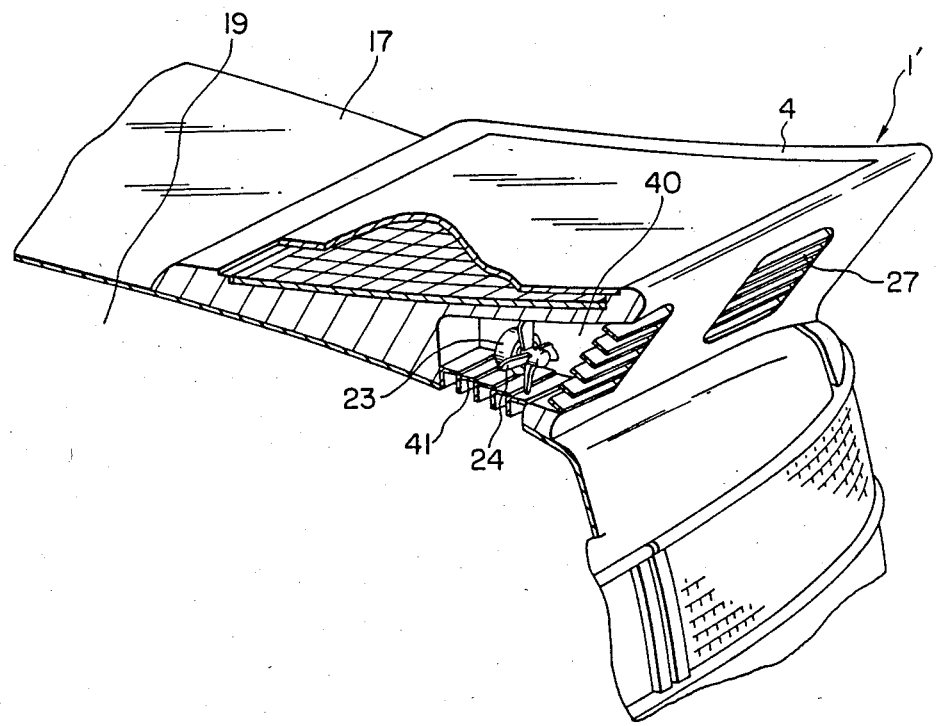
FIG. 4 is a fragmentary perspective view of a ventilation system according to another embodiment of the present invention.
Figure 5:
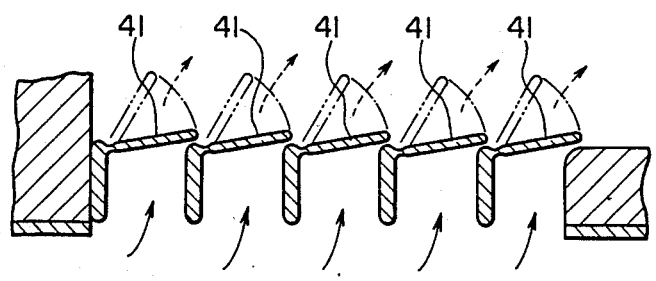
FIG. 5 is an enlarged cross-sectional view of a check valve assembly in the ventilation system shown in FIG. 4.

FIGS. 4 and 5 illustrate a ventilation system according to another embodiment of the present invention.

The ventilation mechanism, generally denoted at 1', includes a rear air spoiler 4 having a plurality of check valves 41 disposed in the vent hole 40 at its inlet for preventing air and hence dust or other foreign matter from flowing back into the trunk room as when the automobile is parked or otherwise at rest. The check valves 41 comprise shutter-type valves made of plastics which can be open under small negative pressure developed in the vent hole 40. While the automobile 10 is running, the check valves 41 are opened under a negative pressure created behind the rear air spoiler 1', and while the automobile 10 is stopped, they are opened under a negative pressure produced by the fan 24.

Figure 6:
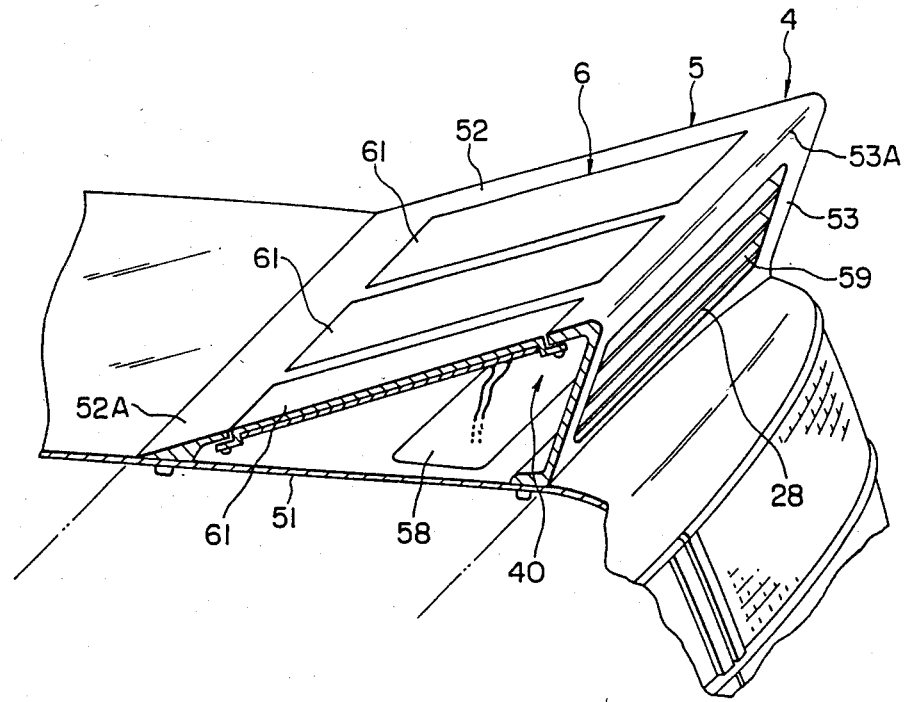
FIG. 6 is a fragmentary perspective view of a ventilation system according to still another embodiment of the present invention.
Figure 7:
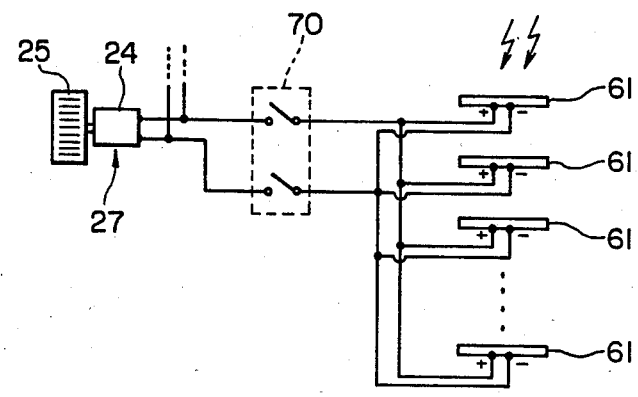
FIG. 7 is a circuit diagram of a circuit arrangement of the ventilation system shown in FIG. 6.

FIGS. 6 and 7 show a ventilation system according to still another embodiment of the present invention. Solar cells 61 are divided into a plurality of solar cell packages which are connected parallel to each other. A ventilating motor-driven fan comprises an existing air conditioning motor-driven air blower 27 (FIG. 7) disposed below an instrument panel in the automobile. The air blower 27 has a sirocco fan 25 connected to a motor 24 energized by the parallel-connected solar cell packages 61. Each of the solar cell packages 61 produces an output voltage ranging from 4 (V) to 8(V). When a switch 70 is turned on, the motor-driven air blower 27 is energized by a power which is ½ through 1/5 of the rated power. The parallel-connected solar cell packages 61 allow continuous operation of the motor-driven air blower 27 even when one or more solar cell packages 61 fails.

Figure 8:
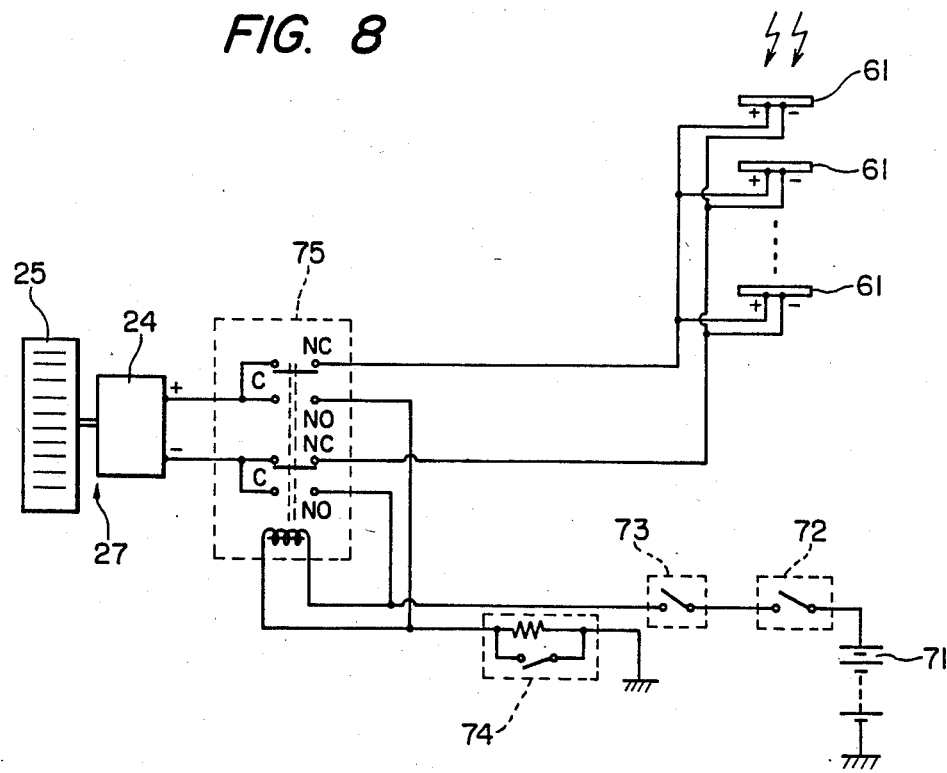
FIG. 8 is a circuit diagram of a circuit arrangement of a ventilation system according to a still further embodiment of the present invention.

A modified circuit arrangement for a ventilation system is illustrated in FIG. 8. The circuit arrangement includes a battery 71 mounted on an automobile, a key switch 72, an air conditioning unit switch 73, a switch 74 for changing intensity modes of an air blower 27, and a solenoid-operated relay 75. Under normal condition, contacts of the solenoid-operated relay 75 are in a normally-closed (NC) position to energize the air blower 27 with electric power from the solar cells 61 to ventilate the passenger compartment and the trunk room when the automobile is parked under the scorching sun, thereby preventing things in the automobile from being thermally deformed or otherwise damaged, and also to lessen the heat in the passenger compartment at the time passengers are in the comartment. When the key switch 72 and the air conditioning unit switch 73 are turned on, the contacts of the solenoid-operated relay 75 are shifted into a normally-open (NO) position to energize air blower 27 with the battery 71.

While in the illustrated embodiments the rear air spoiler 4 is incoporarted in the ventilation system, the front air spoiler 2 or the roof air spoiler 3 may be incorporated in the ventilation system of the invention.

Although certain preferred embodiments of the present invention have been shown and described in detail, it should be understood that various changes and modifications may be made therein without departing from the scope of the appended claims.

What is claimed is:

1. A ventilation system in a motor vehicle having a body including a trunk lid, comprising:
    (a) means defining a ventilating hole in the trunk lid of the motor vehicle for venting an interior of said body to atmosphere;
    (b) an aerodynamic device mounted as a rear air spoiler on the trunk lid and disposed at said ventilating hole, said aerodynamic device having a lower surface held against an outer surface of said body, a substantially horizontal front surface for forming a negative angle of elevation with respect to an air current flowing along said body while the automobile is running, and a rear surface for separating the air current off said body, said front and rear surfaces being joined to each other at an acute angle along a rear edge of said rear air spoiler, said rear surface being inclined upward and rearward with respect to the vertical, said aerodynamic device having a vent hole extending therethrough from said lower surface to said rear surface in communication with said ventilating hole, said vent hole having an outlet opening at said rear surface and spaced from said rear edge;
    (c) a forced-ventilation device disposed in said vent hole and comprising a motor and a fan connected therewith;
    (d) a solar cell assembly mounted on said front surface and electrically connected to said motor; and
    (e) a grille assembly mounted in said vent hole adjacent to said outlet for preventing water from entering said vent hole.

2. A ventilation system according to claim 1, wherein said rear air spoiler includes a thin layer beneath said solar cell assembly, said motor being energizable by said solar cell assembly for enabling said fan to rotate for producing an air flow through said vent hole to cool said solar cell assembly through said thin layer.

3. A ventilation system according to claim 1, wherein said solar cell assembly, said motor, and said fan are attached to said rear air spoiler.

4. A ventilation system according to claim 3, wherein said vent hole has an inlet opening at said lower surface in registry with said ventilating hole, including a grid assembly mounted in said vent hole adjacent to said inlet, and a check valve disposed in said vent hole for preventing air from flowing from said vent hole back into said body.

5. A ventilation system according to claim 3, wherein said body has a trunk room partly defined by said trunk lid and a passenger compartment including a panel having a communication hole through which said passenger compartment communicates with said trunk room.

6. A ventilation system according to claim 2, wherein said rear air spoiler has a space therein below said thin layer, including an air blower disposed out of said space for delivering cooling air through a passenger compartment of the motor vehicle and said space to cool said solar cell assembly through said thin layer.

* * * * *